(12) United States Patent
Clas et al.

(10) Patent No.: US 10,042,954 B2
(45) Date of Patent: *Aug. 7, 2018

(54) DEFINING PAIRING RULES FOR CONNECTIONS

(71) Applicant: International Business Machines Corporation, Armonk, NY (US)

(72) Inventors: Patrick J. Clas, Binghamton, NY (US); Pu Liu, Vestal, NY (US); William F. Phillips, Owego, NY (US); Paul E. Rogers, Johnson City, NY (US); Stephen M. Sweeney, Apalachin, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/386,191

(22) Filed: Dec. 21, 2016

(65) Prior Publication Data

US 2017/0103142 A1    Apr. 13, 2017

Related U.S. Application Data

(63) Continuation of application No. 15/066,363, filed on Mar. 10, 2016, now Pat. No. 9,547,661, which is a continuation of application No. 14/563,635, filed on Dec. 8, 2014.

(51) Int. Cl.
G06F 17/30 (2006.01)

(52) U.S. Cl.
CPC .. *G06F 17/30911* (2013.01); *G06F 17/30153* (2013.01)

(58) Field of Classification Search
None
See application file for complete search history.

(56) References Cited

U.S. PATENT DOCUMENTS

| | | |
|---|---|---|
| 8,225,250 B2 | 7/2012 | Yamazaki et al. |
| 9,547,661 B2 | 1/2017 | Clas et al. |
| 2008/0259816 A1 | 10/2008 | Archer et al. |
| 2016/0162517 A1 | 6/2016 | Clas et al. |

OTHER PUBLICATIONS

List of IBM Patents or Patent Applications Treated as Related; (Appendix P), filed Aug. 11, 2017, 2 pages.

*Primary Examiner* — Tyler Torgrimson
(74) *Attorney, Agent, or Firm* — Cantor Colburn LLP

(57) ABSTRACT

A system and method for compressing that comprises establishing attributes or elements to build a schema that is utilized to generate a record that includes the connection descriptions, building a set of substitution rules by using range expressions and substitution variables, and utilizing the set of substitution rules to associate value assignments that compress the connection descriptions within the record.

1 Claim, 5 Drawing Sheets

DEFINING PAIRING RULES FOR CONNECTIONS

CROSS-REFERENCE TO RELATED APPLICATION

This application is a continuation of U.S. application Ser. No. 15/066,363, Filed on Mar. 10, 2016, and U.S. application Ser. No. 14/563,635, filed on Dec. 8, 2014, the disclosures of which are incorporated by reference herein in their entirety.

The present disclosure relates generally to effectively defining pairing rules for connections, and more specifically, to defining substitution rules and variables, along with organizing source and destination attributes in ranges, via Extensible Markup Language (XML) documents to represent physical cable wiring and/or virtual cable connections.

BACKGROUND

In general, legacy code iterates through a list of cable connection data to verify wiring and generate a verified record detailing a physical cable wiring of a mainframe. Yet, due to the nature of the legacy code, there are many unavoidable if-then-else conditional clauses that make the legacy code difficult to maintain.

For example, to add a new wiring rule to the legacy code, the legacy code must be extensively parsed to identify the right location in which to add the new wiring rule and corresponding verification code. Moreover, tasks such as defining all possible cabling combinations are even more tedious and error prone, particularly because differences between two different wiring connections can be very discrete and imperceptible.

SUMMARY

Embodiments include a method, system, and computer program product for compressing connection descriptions of an operation environment, comprising: establishing, by a management system, source and destination attributes of the connection descriptions to build a schema; generating a record of the connection descriptions based on the schema, wherein the schema is stored in an XML document; generating a set of substitution rules by using range expressions and substitution variables, wherein each rule of the set of substitution rule comprises an ID, a key, and a value, wherein the value defines a pattern string that includes a variable name used in substitution, wherein the set of substitution rules is stored in the XML document stored in the memory; utilizing the set of substitution rules to associate value assignments that change the connection descriptions within the record; parsing the record to identify one of the compressed connection descriptions; locating a rule from the set of substitution rules based on a corresponding variable name utilizing the value within the one of the compressed connection descriptions; and generating a final value for the one of the compressed connection descriptions utilizing the rule Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In view of the nature of the legacy code described above, embodiments described herein relate to defining substitution rules and variables, along with organizing source and destination attributes in ranges, via Extensible Markup Language (XML) documents to represent physical cable wiring and/or virtual cable connections.

Further, embodiments described herein can be implemented via a system, a method, and/or computer program product (e.g., herein summarized as a management system and described further below with reference to FIG. 3, FIG. 4, and FIG. 5) configured to generate records of connections to solve I/O cabling documentation problems and/or pairing itemization problems in an operation environment, such as a mainframe, a software system, cloud environment, etc. Particularly, the management system implements range and substitution models to source and destination attributes of connections to improve and increase clustering. The management system further implements defined substitution rules and variables to represent a cable location pattern in the records, which are managed by the management system in XML documents.

For example, the management system is associated with the operation environment, includes a computer, and operates in accordance with a set of instructions stored on a memory. The set of instructions are executed by a processor of the computer and cause the management system to compress connection descriptions of the operation environment. In operation, the management system establishes attributes or elements to build a schema that is utilized to generate a record that includes the connection descriptions. Further, the management system builds a set of substitution rules by using range expressions and substitution variables and utilizes the set of substitution rules to associate value assignments that compress the connection descriptions within the record. In turn, the management system can parse the record to identify one of the compressed connection descriptions, locate a substitution rule from the set of substitution rules by a value of an element or attribute within the one of the compressed connection descriptions, and generate a final value for the one of the compressed connection descriptions utilizing the substitution rule.

In this way, the management system optimizes connection record generation by ensuring each connection of the record is correct via a predefined wiring rule, ensuring there are no duplicate connections generated in a record, and determining that correct connections are utilized during implementation of the operation environment.

Figure 1:
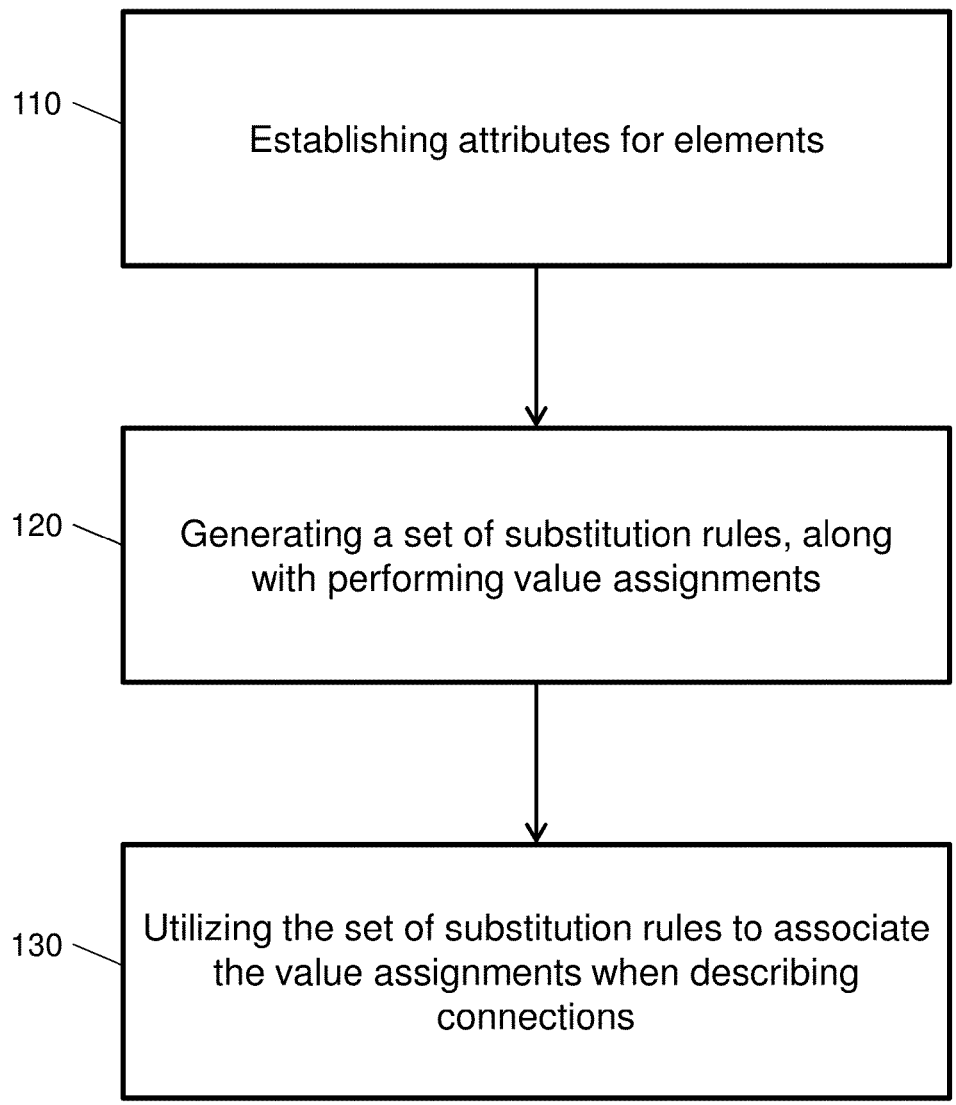
FIG. 1 depicts a process flow in accordance with an embodiment of the present invention.

Turning now to FIG. 1, a process flow 100 is generally shown in accordance with an embodiment of the present invention. At block 110, the management system establishes attributes or elements to build a schema in which the management system will utilize to generate records of connections (e.g., physical cable wiring and/or virtual cable connections).

In one embodiment, physical cable wiring or cabling records can include source and destination endpoints of cables. The source endpoints are described by enclosure identifications and card types. The destination endpoints are described by slot identifications (e.g., and the enclosure id and card type of the field replaceable unit or 'FRU' which it contains). Cabling records can also include location information for the cable record in a virtual private database for the FRU in the destination endpoint. The location information can follow a specific pattern that contains many parts such as enclosure location, FRU name, and jack for both ends of the cable, slot, and type.

One example of the substitution XML schema is defined as follows:

```
<?xml version="1.0" encoding="UTF-8" ?>
<xs:schema xmlns:xs="http://www.w3.org/2001/XMLSchema">
<xs:element name="fru">
 <xs:complexType>
    <xs:attribute name="record_type" type="xs:string"
       use="required"/>
    <xs:attribute name="location" type="xs:string" use="required"/>
    <xs:attribute name="ccin" type="xs:string" use="required"/>
    <xs:attribute name="part_number" type="xs:string"
       use="required"/>
 </xs:complexType>
</xs:element>
<xs:element name="to">
 <xs:complexType>
    <xs:sequence>
        <xs:element ref="fru" maxOccurs="unbounded">
    </xs:sequence>
    <xs:attribute name="enclosure" type="xs:string" use="required"/>
    <xs:attribute name="slot" type="xs:string" use="required"/>
    <xs:attribute name="card_type" type="xs:string" use="required"/>
    <xs:attribute name="jack" type="xs:string" use="required"/>
 </xs:complexType>
</xs:element>
<xs:element name="from">
 <xs:complexType>
    <xs:sequence>
        <xs:element ref="to" maxOccurs="unbounded">
    </xs:sequence>
    <xs:attribute name="enclosure" type="xs:string" use="required"/>
    <xs:attribute name="slot" type="xs:string" use="required"/>
    <xs:attribute name="card_type" type="xs:string" use="optional"/>
    <xs:attribute name="base_card_type" type="xs:string"
       use="optional"/>
    <xs:attribute name="daughter_card_type" type="xs:string"
       use="optional"/>
    <xs:attribute name="jack" type="xs:string" use="required"/>
 </xs:complexType>
</xs:element>
<xs:element name="substitution">
 <xs:complexType>
    <xs:attribute name="key" type="xs:string" use="required"/>
    <xs:attribute name="id" type="xs:string" use="required"/>
    <xs:attribute name="value" type="xs:string" use="required"/>
 </xs:complexType>
</xs:element>
<xs:element name="io_cable_rules">
 <xs:complexType>
    <xs:sequence>
        <xs:element ref="substitution" maxOccurs="unbounded">
    </xs:sequence>
    <xs:sequence>
        <xs:element ref="from" maxOccurs="unbounded">
    </xs:sequence>
        <xs:attribute name="value" type="xs:string" use="required"/>
 </xs:complexType>
</xs:element>
</xs:schema>
```

Note that in the <from> element, the "enclosure" attribute is using a range expression to include for multiple source endpoints. Further, in the <to> element, the "slot" attribute is using a range expression to include multiple target endpoints.

At block 120, the management system generates a set of rules, along with performing value assignments. That is, the management system builds the substitution rules that define connections and wiring pairing. Embodiments of the design compress content (e.g., connection descriptions) by using range expressions and substitution variables, where the substitution values can be stored in the same or different XML documents as the records, and/or fed by the management system during run-time.

With respect to range expressions, the management system can define connections between two endpoints by applying a range expression, e.g., as denoted by the expression: (([0-9]+|0[xX][0-9a-fA-F]+)(\\.\\.([0-9]+|0[xX][0-9a-fA-F]+))*)(?:$|[,]+). Further, a range string can be defined as "[numbers, numberLow . . . numberHigh]". In this way, the following sample [0x1, 0x3, 0x4 . . . 0x8, 0x13, 0x15 . . . 0x19] describes illustrates that 0x2 is omitted while all values including and between 0x4 and 0x8 are included.

With respect to substitution rules and substitution variables, the management system may implement the following rule set:

```
<!-- Substitution -->
< substitution id="location" key="internal" value="$loc_f;$fru_f "/>
< substitution id="location" key="external-IC"
value="$loc_f$j_f;-ICBCBL"/>
< substitution id="location" key="external-IF"
value="$loc_f.$j_f;-IFBCBL"/>
``` where the <substitution> section defines all substitution rules. Each rule contains the ID, key, and value. ID specifies which element or attribute will be applied this rule. Key is used in subsequent XML elements to refer to this rule. Value defines the pattern string which includes the variable names used in the substitution.

Figure 2:
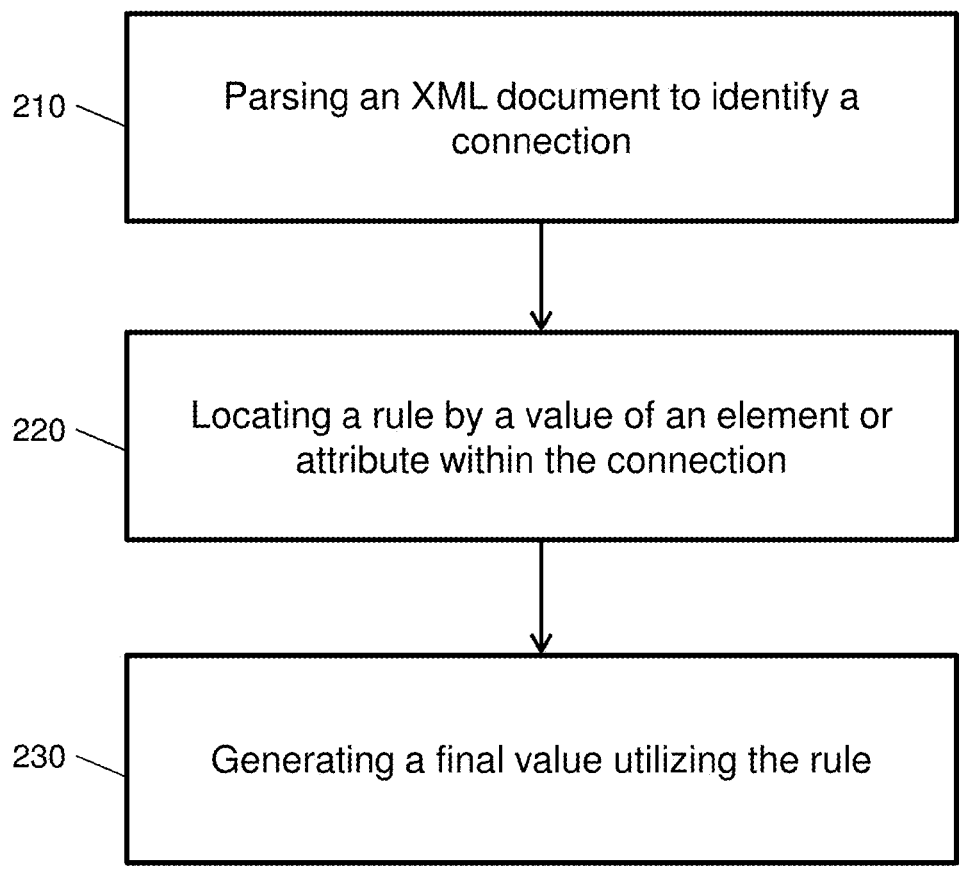
FIG. 2 depicts another process flow in accordance with an embodiment of the present invention.

At block 130, the management system utilizes the set of substitution rules to associate the value assignments when describing connections. Block 130 will now be described with respect to FIG. 2, which is a process flow 200 that in accordance with another embodiment of the present invention. At block 210, the management system can parse the XML document to identify a connection. For example, to find a given cable connection, such as one with the description of:

```
<!-- PCIe cables -->
<from enclosure="[16..20]" slot="0x6502" card_type="0x10351007">
  <to enclosure="[33,39]" slot_type="0x10" min_slot="01"
  max_slot="19"    card_type="0x10352002">
        <fru record_type="fru" location="internal" ccin="C002"
        part_number="46K3"/>
    </to>
</from>
``` the management system can parse the XML, document with a map of key/value. One example of a key/value map is as follows: map={"loc_F:"myLocF", "fruUf":"myFru"}.

Then, at block 220, the management system locates a rule by a value of an element or attribute within the connection. For instance, if the element or attribute of the cable connection is the ID of the substitution rule, then the management system locates the substitution rule by that value. In the above example, the rule is with the key "internal".

Next, at block 230, the management system generates the final value utilizing the rule. For example, because the value of the rule is "$loc_f;$fru_f", the management system can utilize this value to look up in the map the final value of "myLocF;myFru".

In view of the above, embodiments herein include a method, system, and computer program product for compressing connection descriptions of an operation environment, comprising: establishing attributes or elements to build a schema that is utilized to establishing source and destination attributes of the connection descriptions to build a schema; generating a record of the connection descriptions based on the schema; utilizing range expressions and substitution variables to generate a set of substitution rules; associating via the set of substitution rules value assignments that changes the connection descriptions within the record to produce a plurality of compressed connections; parsing the record to identify a first compressed connection within the plurality of compressed connections; locating a substitution rule from the set of substitution rules by a value assignment of the first compressed connection; and generating a final value for the first compressed connection utilizing the substitution rule.

Embodiments of the present invention, such as a management system that implements the process flows 100, 200 described above, may be a system (e.g., a mainframe or software system implemented on a cloud computing environment), a method, and/or a computer program product. Further, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The computer program product may include a computer readable storage medium (or media) having computer readable program instructions thereon for causing a processor to carry out aspects and/or embodiments of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With respect to implementing aspect and/or embodiments of the present invention on cloud computing environment, cloud computing in general is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics can be on-demand self-service; broad network access; resource pooling; rapid elasticity; and measured service.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Three service models can include Software as a Service (SaaS); Platform as a Service (PaaS); and Infrastructure as a Service (IaaS).

SaaS: the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

PaaS: the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

IaaS: the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models can include private cloud; community cloud, public cloud; and hybrid cloud.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
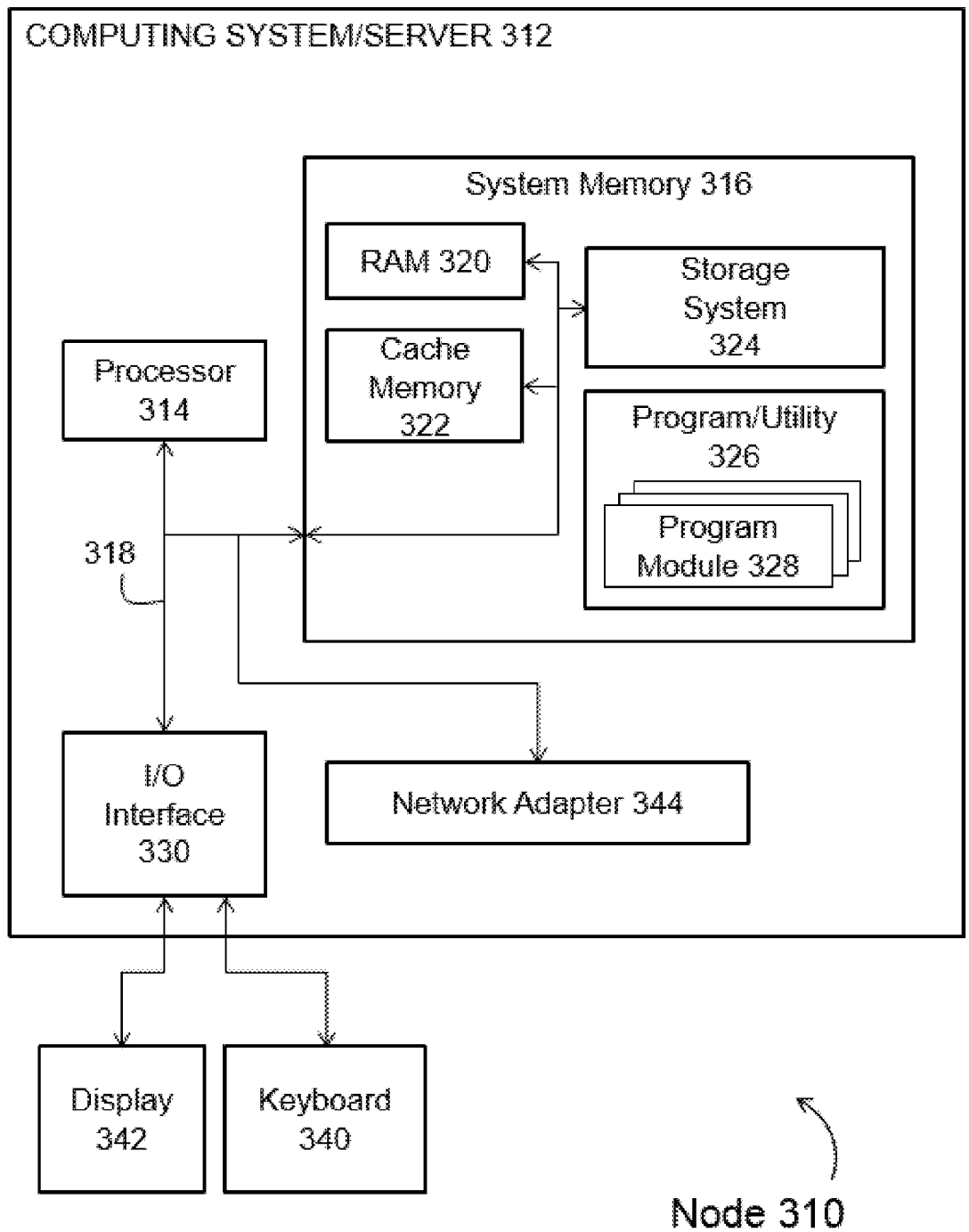
FIG. 3 depicts a cloud computing node according to an embodiment of the present invention.

Referring now to FIG. 3, a schematic of an example of a cloud computing node is shown. A cloud computing node 310 is only one example of a suitable cloud computing node and is not intended to suggest any limitation as to the scope of use or functionality of embodiments of the invention described herein. Regardless, the cloud computing node 310 is capable of being implemented and/or performing any of the functionality set forth hereinabove.

In the cloud computing node 310 there is a computer system/server 312, which is operational with numerous other general purpose or special purpose computing system environments or configurations. Examples of well-known computing systems, environments, and/or configurations that may be suitable for use with the computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 312 may be described in the general context of computer system executable instructions, such as program modules, being executed by a computer system. Generally, program modules may include routines, programs, objects, components, logic, data structures, and so on that perform particular tasks or implement particular abstract data types. The computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system/server 312 in the cloud computing node 310 is shown in the form of a general-purpose computing device. The components of the computer system/server 312 may include, but are not limited to, one or more processors or processing units (e.g., processor 314), a system memory 316, and a bus 318 that couples various system components including the system memory 316 to the processor 314.

The bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 312 typically includes a variety of computer system readable media. Such media may be any available media that is accessible by the computer system/server 312, and it includes both volatile and non-volatile media, removable and non-removable media.

The system memory 316 can include computer system readable media in the form of volatile memory, such as a random access memory (RAM) 320 and/or a cache memory 322. The computer system/server 312 may further include other removable/non-removable, volatile/non-volatile computer system storage media. By way of example only, storage system 324 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 318 by one or more data media interfaces. As will be further depicted and described below, the system memory 316 may include at least one program product having a set (e.g., at least one) of program modules that are configured to carry out the functions of embodiments of the invention.

For example, a program/utility 326, having a set (at least one) of program modules (e.g., a program module 328), may be stored in the system memory 316 by way of example, and not limitation, as well as an operating system, one or more application programs, other program modules, and program data. Each of the operating system, one or more application programs, other program modules, and program data or some combination thereof, may include an implementation of a networking environment. The program modules 326 generally carry out the functions and/or methodologies of embodiments of the invention as described herein.

The computer system/server 312 may also communicate (e.g., via Input/Output (I/O) interfaces, such as I/O interface 330) with one or more external devices, such as a keyboard 340, a pointing device, a display 342, etc.; one or more devices that enable a user to interact with the computer system/server 312; and/or any devices (e.g., network card, modem, etc.) that enable the computer system/server 312 to communicate with one or more other computing devices. Still yet, the computer system/server 312 can communicate with one or more networks such as a local area network (LAN), a general wide area network (WAN), and/or a public network (e.g., the Internet) via a network adapter 344. As depicted, the network adapter 344 communicates with the other components of the computer system/server 312 via the bus 318. It should be understood that although not shown, other hardware and/or software components could be used in conjunction with the computer system/server 312. Examples, include, but are not limited to: microcode, device drivers, redundant processing units, external disk drive arrays, RAID systems, tape drives, and data archival storage systems, etc.

Figure 4:
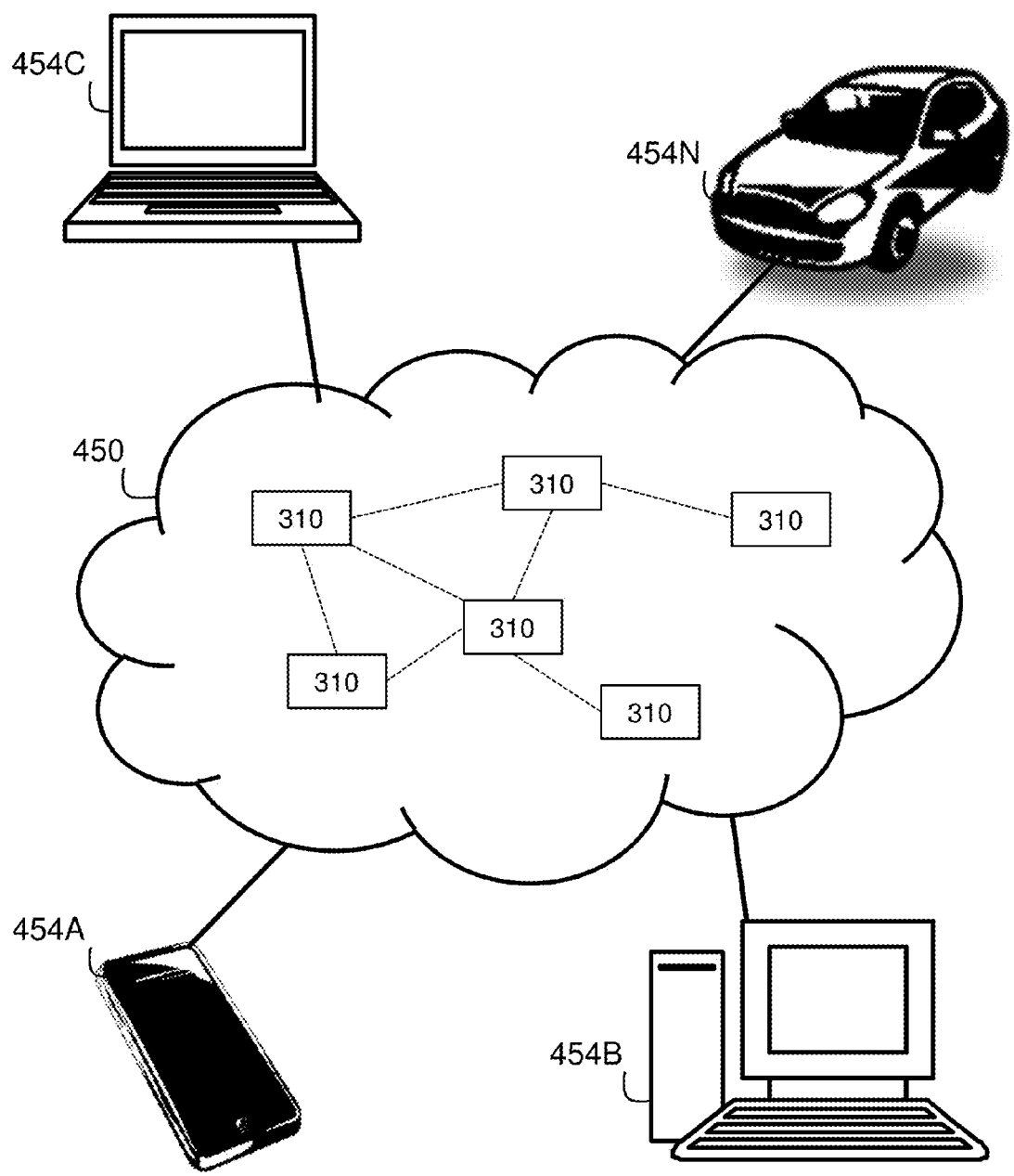
FIG. 4 depicts a cloud computing environment according to an embodiment of the present invention.

Referring now to FIG. 4, illustrative cloud computing environment 50 is depicted. As shown, the cloud computing environment 450 comprises one or more cloud computing nodes 310 with which local computing devices used by cloud consumers, such as, for example, a personal digital assistant (PDA) or cellular telephone 454A, a desktop computer 454B, a laptop computer 454C, and/or an automobile computer system 454N may communicate. The cloud computing nodes 310 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that the computing nodes 310 and cloud computing environment 450 can communicate with any type of computerized device over any type of network and/or network addressable connection (e.g., using a web browser).

Figure 5:
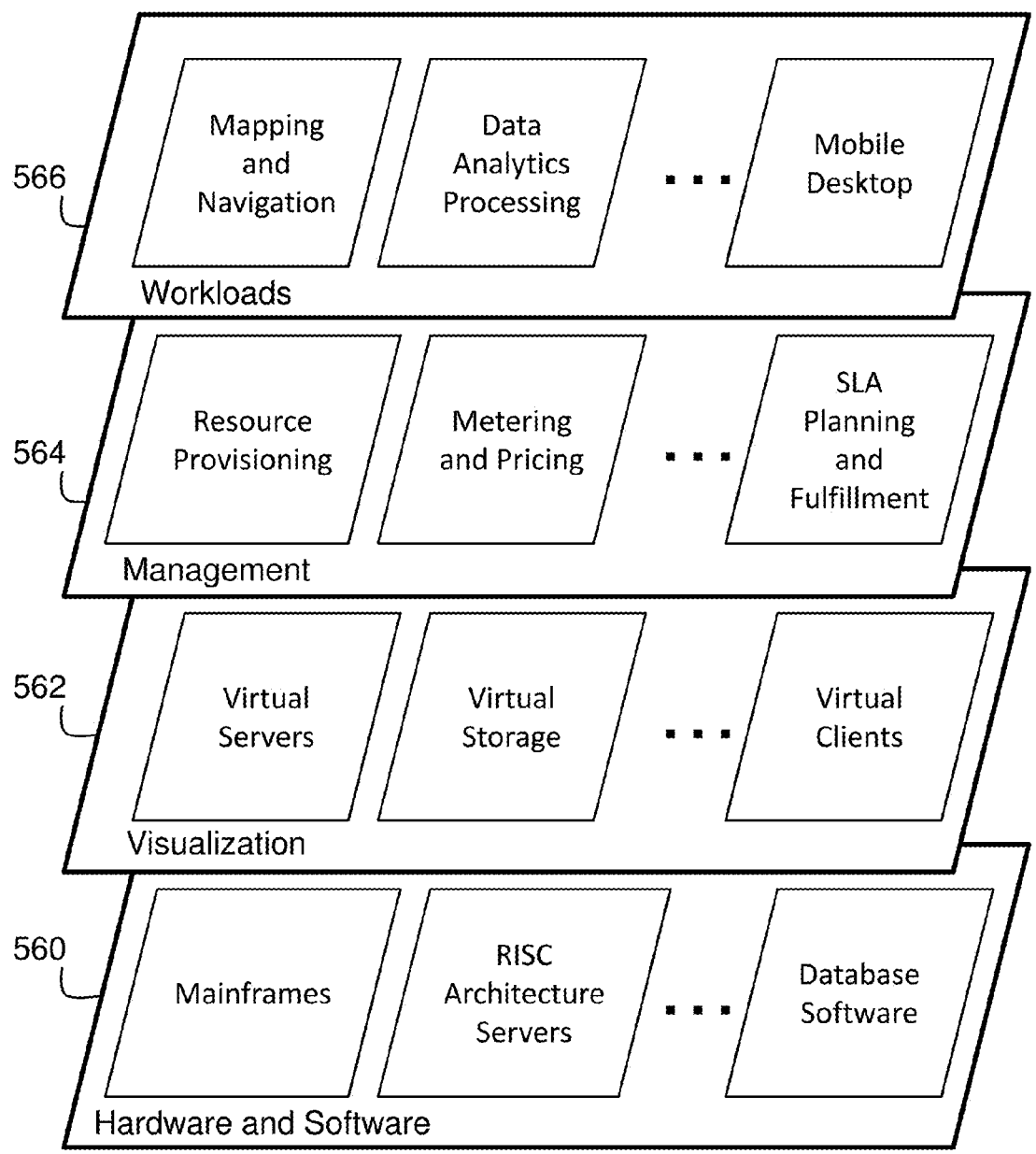
FIG. 5 depicts abstraction model layers according to an embodiment of the present invention.

Referring now to FIG. 5, a set of functional abstraction layers provided by cloud computing environment 450 (FIG.

4) is shown. It should be understood in advance that the components, layers, and functions shown in FIG. 5 are intended to be illustrative only and embodiments of the invention are not limited thereto. As depicted, the following layers and corresponding functions are provided:

A hardware and software layer 560 includes hardware and software components. Examples of hardware components include mainframes, in one example IBM zSeries systems; RISC (Reduced Instruction Set Computer) architecture based servers, in one example IBM p Series systems; IBM xSeries systems; IBM BladeCenter systems; storage devices; networks and networking components. Examples of software components include network application server software, in one example IBM WebSphere application server software; and database software, in one example IBM DB2 database software. (IBM, zSeries, p Series, xSeries, BladeCenter, Web Sphere, and DB2 are trademarks of International Business Machines Corporation registered in many jurisdictions worldwide).

A virtualization layer 562 provides an abstraction layer from which the following examples of virtual entities may be provided: virtual servers; virtual storage; virtual networks, including virtual private networks; virtual applications and operating systems; and virtual clients.

In one example, a management layer 564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators.

Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Technical effects and benefits of embodiments of the management system include generating records of connections that solve I/O cabling documentation problems and/or pairing itemization problems in operation environments. Further, embodiments of the management system optimize connection record generation by ensuring each connection of the record is correct via a predefined wiring rule, ensuring there are no duplicate connections generated in a record, and determining that correct connections are utilized during implementation of the operation environment. In this way, embodiments of the management system improve upon XML code by adding flexibility and extensibility that saves/restores object data to/from with respect to XML documents including the connection records.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A processor implemented method for generating flexible and extensible compressed connection descriptions based on connection descriptions of physical cable and virtual cable connections of an operation environment, the method executed by a management system including a processor and a memory, the method comprising:
   building, by the management system, a schema via establishing source and destination attributes of the connection descriptions,
   wherein the source and destination attributes comprise record type, location type, ccin type, and part number type attributes;
   generating, utilizing the schema by the management system, a record of the connection descriptions,
   wherein the schema is stored in an XML, document;
   generating a set of substitution rules by using range expressions and substitution variables,
   wherein each rule of the set of substitution rule comprises an ID, a key, and a value,
   wherein the value defines a pattern string that includes a variable name used in substitution,
   wherein the set of substitution rules is stored in the XML document stored in the memory;
   utilizing the set of substitution rules to associate value assignments to the connection descriptions,
   wherein the value assignments change the connection descriptions within the record to produce the compressed connection descriptions;
   parsing the record to identify one of the compressed connection descriptions;
   locating a predefined wiring rule from the set of substitution rules based on a corresponding variable name utilizing the value within the one of the compressed connection descriptions,
   wherein the predefined wiring rule ensures no duplicate connections are generated in the record; and
   generating a final value for the one of the compressed connection descriptions utilizing the predefined wiring rule.

* * * * *